US011957239B2

(12) United States Patent
DePaola

(10) Patent No.: US 11,957,239 B2
(45) **Date of Patent: *Apr. 16, 2024**

(54) ARTISTS' BRUSH COVER

(71) Applicant: LIKWID CONCEPTS LLC, Jackson, NJ (US)

(72) Inventor: John Anthony DePaola, Jackson, NJ (US)

(73) Assignee: Likwid Concepts LLC, Jackson, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,519

(22) Filed: Feb. 24, 2022

(65) Prior Publication Data

US 2022/0175128 A1 Jun. 9, 2022

Related U.S. Application Data

(63) Continuation of application No. 16/157,421, filed on Oct. 11, 2018, now Pat. No. 11,297,934.
(Continued)

(51) Int. Cl.
*A46B 17/02* (2006.01)
*A46B 17/04* (2006.01)
(Continued)

(52) U.S. Cl.
CPC ............. *A46B 17/02* (2013.01); *A46B 17/04* (2013.01); *B44D 3/02* (2013.01); *B44D 3/123* (2013.01);
(Continued)

(58) Field of Classification Search
CPC ... A46B 17/02; A46B 17/04; A46B 2200/205; B44D 3/123; B44D 3/125; B44D 3/02
(Continued)

(56) References Cited

U.S. PATENT DOCUMENTS

| | | | |
|---|---|---|---|
| 704,204 | A | 7/1902 | Morris |
| 1,851,521 | A | 3/1932 | Frank |

(Continued)

FOREIGN PATENT DOCUMENTS

| | | | |
|---|---|---|---|
| AU | 2007207862 | A1 | 2/2008 |

OTHER PUBLICATIONS

International Search Report and Written Opinion in PCT/US2018/055370, dated Jan. 8, 2019.

*Primary Examiner* — Chun Hoi Cheung
*Assistant Examiner* — Brijesh V. Patel
(74) *Attorney, Agent, or Firm* — Charney IP Law LLC

(57) ABSTRACT

An artists' brush storage and protection device includes a storage unit having a plurality of storage compartments, each of the storage compartments including a cover with a paint well below the cover, the paint well defined in part by upstanding walls, an exterior one of the upstanding walls defining a recess with a resilient sealing member disposed therein. Each of the covers may be opened permitting access to the paint well or closed against the upstanding walls of the paint well and the sealing member. The storage unit may further include drawer slides and a palette slidable on the drawer slides relative to the storage unit to reveal or conceal the palette. When bristles of a paint brush are placed in the paint well, its handle rests upon the resilient sealing member which compresses around the handle when the cover is closed to provide a substantially air-tight seal.

22 Claims, 13 Drawing Sheets

Related U.S. Application Data

(60) Provisional application No. 62/570,747, filed on Oct. 11, 2017.

(51) Int. Cl.
*B44D 3/02* (2006.01)
*B44D 3/12* (2006.01)

(52) U.S. Cl.
CPC ........ *B44D 3/125* (2013.01); *A46B 2200/205* (2013.01)

(58) Field of Classification Search
USPC ........................... 206/1.7–1.9, 361, 575–576
See application file for complete search history.

(56) References Cited

U.S. PATENT DOCUMENTS

| | | | |
|---|---|---|---|
| 1,869,753 | A | 8/1932 | Richard |
| 2,182,046 | A | 12/1939 | Crabbe |
| 2,485,068 | A | 10/1949 | Santana |
| 3,139,208 | A | 6/1964 | Irwin et al. |
| 3,280,966 | A | 10/1966 | Boniface |
| 4,423,811 | A | 1/1984 | Knapp |
| 4,765,457 | A | 8/1988 | Rayhle |
| 4,767,655 | A | 8/1988 | Tschudin-Mahrer |
| 5,174,445 | A | 12/1992 | Mull |
| 5,540,363 | A | 7/1996 | Wilson |
| 5,645,167 | A | 7/1997 | Conrad |
| D401,765 | S | 12/1998 | Soutullo |
| 6,390,430 | B1 | 5/2002 | Hawley |
| D491,730 | S | 6/2004 | Goulet et al. |
| D503,282 | S | 3/2005 | Murphy |
| D511,412 | S | 11/2005 | Madrid et al. |
| 7,207,437 | B1 | 4/2007 | Johansson |
| 7,401,614 | B2 | 7/2008 | Ruzumna |
| 7,537,111 | B2 | 5/2009 | Hart et al. |
| D623,862 | S | 9/2010 | Nitzsche |
| 7,927,430 | B2 | 4/2011 | Hart et al. |
| 7,987,980 | B1 | 8/2011 | Hahn |
| 8,074,796 | B1 | 12/2011 | Andrews |
| 9,303,912 | B1 | 4/2016 | Schalla et al. |
| 2002/0157978 | A1 | 10/2002 | Roundy |
| 2003/0057110 | A1 | 3/2003 | Montgomery |
| 2004/0050732 | A1 | 3/2004 | Baker |
| 2005/0247030 | A1 | 11/2005 | Phillips et al. |
| 2008/0035495 | A1 | 2/2008 | Discko |
| 2014/0014542 | A1 | 1/2014 | Depaola, Jr. et al. |

ARTISTS' BRUSH COVER

CROSS-REFERENCE TO RELATED APPLICATIONS

The present application is a continuation application of U.S. patent application Ser. No. 16/157,421 entitled "ARTISTS' BRUSH COVER," filed Oct. 11, 2018, which claims the benefit of U.S. Provisional Application No. 62/570,747 entitled "ARTISTS' BRUSH COVER," filed Oct. 11, 2017, the disclosures of which are hereby incorporated by reference herein.

BACKGROUND OF THE INVENTION

The present, invention relates to storage and protection devices for paint brushes, and specifically for a plurality of artists' brushes.

To produce their art, artists utilize brushes in many shapes and sizes, even for a single artistic piece. Brushes commonly used include round, flat, bright, filbert, fan, angle, mop, and rigger brushes. Additional brush types are also known. Moreover, each of these brushes are manufactured and utilized in different sizes ranging generally from size 20/0 through size 30.

It is therefore necessary for the artists to switch from brush to brush, often many times during a single painting session. To date, artists may clean each brush before moving to the next brush to prevent the paint on the earlier used brush from hardening during storage. This is a time-consuming task and is also environmentally unsound. Perhaps more importantly, the artist may have a particular mix of paints on the brush that they would prefer not to discard but would rather reuse in the future.

In such cases, the artist would have to move quickly through the next desired brushes and attempt to return to the original brush, with the mix of colors desired, before the paint dried. Obviously, this can impair the artist's ability to create great works.

It is also common knowledge that brushes used by artists can be quite expensive. It is therefore preferential to maintain these brushes in safe condition when not in use.

Lastly, many artists utilize a palette where they mix colors for use in painting. Conventional palettes typically consist of wooden boards where the pure colors and mixed colors are subjected to atmospheric conditions. It would be beneficial to provide for placing pure colors and subsequently mixing those colors under conditions where the paint is protected from drying.

BRIEF SUMMARY OF THE INVENTION

It would therefore be advantageous to provide a paint brush storage and protection device specifically designed for the needs of the artist. Such a device would preferably be capable of storing artists brushes in a safe condition, preserve pure and mixed paints, and permit extended storage of wet brushes and paint.

In accordance with one aspect of the present invention an artists' brush storage and protection device includes a storage unit forming a plurality of storage compartments, each including a paint well and a cover which may be placed in a first condition permitting access to the paint well and a second condition enclosing the paint well; the storage unit further including a drawer slide; and, a palette, the palette being slidable relative to the storage unit on the drawer slide to reveal or conceal the palette.

In accordance with another aspect of the present invention, an artists' brush storage and protection device includes a storage unit forming a plurality of storage compartments, each including a paint well and a cover which may be placed in a first condition permitting access to the paint well and a second condition enclosing the paint well; the storage unit further including a drawer slide; and, a palette, the palette being slidable relative to the storage unit on the drawer slide to reveal or conceal the palette; wherein at least one of the plurality of storage compartments includes a recess, the recess being tilled with a sealing member.

In accordance with a further aspect of the present invention, an artists' brush storage and protection device includes a storage unit forming a plurality of storage compartments, each including a paint well and a cover which may be placed in a first condition permitting access to the paint well and a second condition enclosing the paint well; the storage unit further including a drawer slide; and, a palette, the palette being slidable relative to the storage unit on the drawer slide to reveal or conceal the palette; wherein the palette includes a plurality of recessed wells adapted for the placement of paint.

In accordance with another aspect of the present invention, an artists' brush storage and protection device includes a storage unit forming a plurality of storage compartments, each including a paint well and a cover which may be placed in a first condition permitting access to the paint well and a second condition enclosing the paint well; the storage unit further including a drawer slide; and, a palette, the palette being slidable relative to the storage unit on the drawer slide to reveal or conceal the palette; wherein the cover in the second condition encloses the paint well in a substantially air-tight manner.

In a further aspect of the invention, identified hereinafter as aspect A, an artists' brush storage and protection device includes a storage unit having a plurality of storage compartments, each of the plurality of storage compartments including a cover with an associated paint well below the cover, the associated paint well defined in part by upstanding walls, an exterior one of the upstanding walls defining a recess with a resilient sealing member disposed in the recess; wherein, each of the covers is adapted to be placed in an open condition permitting access to the associated paint well and a closed condition positioned against the upstanding walls of the associated paint well and the coaling member.

In the artists' brush storage and protection device of aspect A, each of the covers may be hinged to the storage unit.

In the artists' brush storage and protection device of aspect A, the artists' brush storage and protection device may further include a palette, the palette being adapted for positioning below the storage unit.

In the artists' brush storage and protection device of aspect A, the artists' brush storage and protection device may further include a palette and drawer slides, the palette being adapted for positioning below the storage unit and being slidable relative to the storage unit via the drawer slides to reveal or conceal the palette.

In the artists' brush storage and protection device of aspect A, the artists' brush storage and protection device may further include drawer slides and a palette having a plurality of recessed wells, the palette being adapted for positioning below the storage unit and being slidable relative to the storage unit via the drawer slides to reveal or conceal the palette.

The artists' brush storage and protection device of aspect A may further include a first row and a second row of storage compartments.

The artists' brush storage and protection device of aspect A may further include a first row and a second row of storage compartments, each of the storage compartments being hinged to the storage unit.

The artists' brush storage and protection device of aspect A may further include a first row and a second row of storage compartments, each of the storage compartments being hinged to the storage unit, wherein hinged is via a living hinge, and wherein each of the living hinges are aligned with one another.

In the artists' brush storage and protection device of aspect A, the storage compartments may all be of equal size.

In the artists' brush storage and protection device of aspect A, the storage compartments may include floors, the floors being sloped toward the associated recess.

In the artists' brush storage and protection device of aspect A, the closed condition may be substantially air tight.

The artists' brush storage and protection device of aspect A may further include an additional sealing member associated with each of the covers.

In the artists' brush storage and protection device of aspect A, when bristles of a paint brush are placed in a paint well, a handle of the paint brush may rest upon the resilient sealing member, the resilient sealing member being adapted to compress around the handle to provide a substantially air-tight seal between the paint well and the atmosphere outside of the paint well.

In a further aspect of the invention, identified hereinafter as aspect B, an artists' brush storage and protection device includes a storage unit having a plurality of storage compartments, at least one of the plurality of storage compartments including a cover with an associated paint well below the cover, the associated paint well defined in part by upstanding walls, one of the upstanding walls including a recess with a sealing member disposed in the recess, wherein, the cover is hinged and adapted to be placed in an open condition permitting access to the associated paint well and a closed condition positioned against the upstanding walls and the sealing member of the associated paint well; drawer slides associated with the storage unit; and, a palette, the palette being slidable relative to the storage unit via the drawer slides to reveal or conceal the palette.

In the artists' brush storage and protection device of aspect B, hinged may be via a living hinge.

In the artists' brush storage and protection device of aspect B, hinged may be via a living hinge and the cover may further include an additional sealing member.

In the artists' brush storage and protection device of aspect B, hinged may be via a living hinge and the cover may further include an additional sealing member, and the at least one of the plurality of storage compartments including a cover may be a plurality of storage compartments, each of the living hinges being aligned with one another.

In the artists' brush storage and protection device of aspect B, hinged may be via a living hinge and the cover may further include an additional sealing member, and the at least one of the plurality of storage compartments including a cover may be a plurality of storage compartments, each of the living hinges being aligned with one another, wherein, when bristles of a paint brush are placed in a paint well, a handle of the paint brush may rest upon the resilient sealing member, the resilient sealing member being adapted to compress around the handle to provide a substantially air-tight seal between the paint well and the atmosphere outside of the paint well.

The artists' brush storage and protection device of aspect B may further include two rows of storage compartments, a first of the rows having more storage compartments than a second of the rows.

In another aspect of the invention, identified hereinafter as aspect C, an artists' brush storage and protection device includes a storage unit having a plurality of storage compartments aligned in a first row and a second plurality of storage compartments aligned in a second row, each of the first plurality and second plurality of storage compartments including a cover with an associated paint well below the cover, the associated paint well defined in part by upstanding walls, one of the upstanding walls including a recess with a sealing member disposed in the recess at an exterior portion of the storage unit, wherein, the cover is hinged and adapted to be placed in an open condition permitting access to the associated paint well and a closed condition positioned against the upstanding walls and the sealing member of the associated paint well; drawer slides associated with the storage unit; and, a palette, the palette being slidable relative to the storage unit via the drawer slides to reveal or conceal the palette.

BRIEF DESCRIPTION OF THE DRAWING FIGURES

The organization and method of operation of this concept, together with features, objects, and advantages thereof, will be or become apparent to one with skill in the art upon reference to the following detailed description when read with the accompanying drawings. It is intended that any additional organizations, methods of operation, features, objects or advantages ascertained by one skilled in the art be included within this description, be within the scope of the present invention, and be protectable.

BRIEF DESCRIPTION OF THE DRAWING FIGURES

The subject matter regarded as the invention in particularly pointed out and distinctly claimed in the concluding portion of the specification. The invention, however, both as to organization and method of operation, together with features, objects, and advantages thereof, will be or become apparent to one with skill in the art upon reference to the following detailed description when read with the accompanying drawing. It is intended that any additional organizations, methods of operation, features, objects or advantages ascertained by one skilled in the art be included within this description, be within the scope of the present invention, and be protected by the accompanying claims.

With respect to the drawings, FIG. 1 depicts a top view of the storage unit portion of an artists' brush cover in accordance with a first embodiment of the present invention;

DETAILED DESCRIPTION

Figure 1:
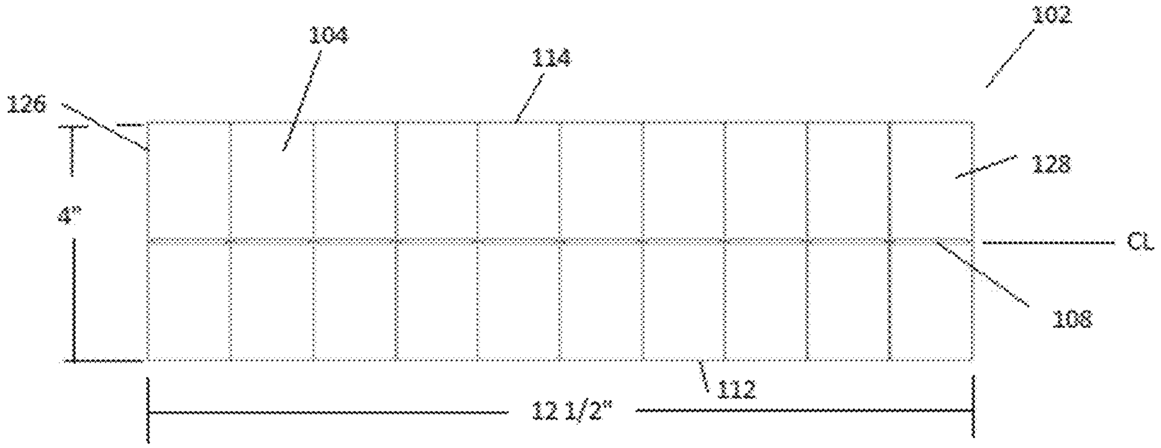
Figure 2:
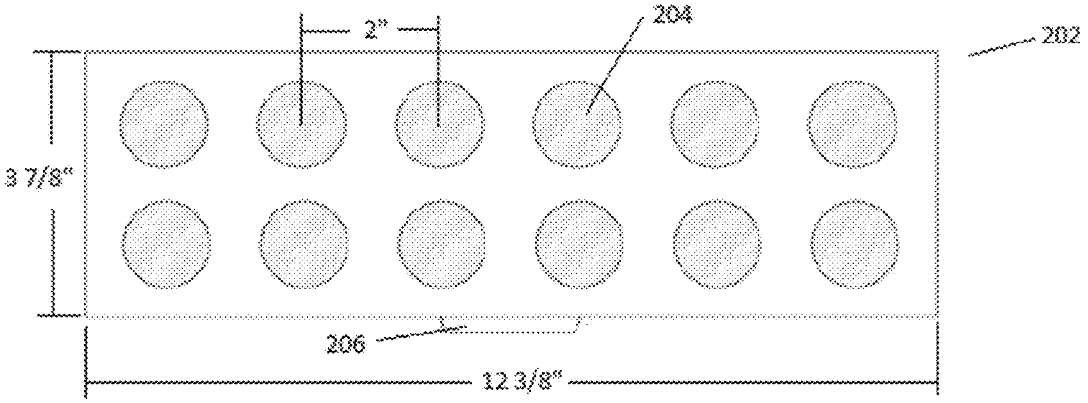
FIG. 2 depicts a top view of the palette portion of the artists' brush cover in accordance with the first embodiment of the present invention.
Figure 3:
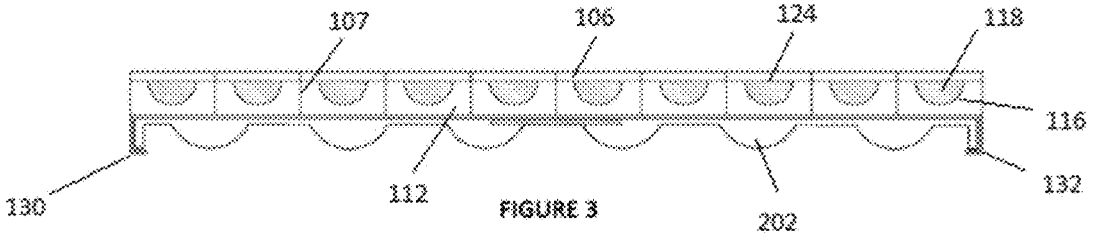
FIG. 3 depicts a front view of the artists' brush cover of the first embodiment of the present invention.

In the following are described the preferred embodiments of the ARTISTS' BRUSH COVER of the present invention. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Where like elements have been depicted in multiple embodiments, identical reference numerals have been used in the multiple embodiments for ease of understanding.

Details of the invention may be appreciated by considering the entirety of the submission. However, in accordance with a first embodiment of the present invention, shown in FIGS. 1-13, an artists' brush cover 100 comprises a storage unit 102 and a palette 202, where the palette is slidably engaged to an underside 103 of the storage unit. In other embodiments the palette may be other than slidably engaged.

The storage unit 102 in the first embodiment is preferably rectangular and comprises two rows of ten storage compartments 104, for a total of twenty storage compartments. The storage compartments 104 each include a cover 106 that can rotate open or closed via a hinge 108, such as a living hinge, the hinges all aligned with one another, here being aligned along a centerline CL of the storage unit 102. In other embodiments the hinges need not be aligned, or the covers may not include hinges.

Figure 4:
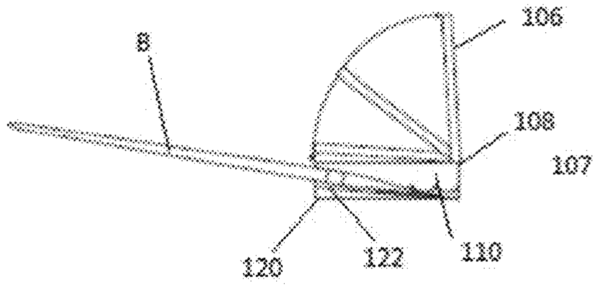
FIG. 4 depicts a side view detail of a paint well portion of the artists' brush cover of the first embodiment of the present invention, with the cover shown in various positions and a paint brush positioned for storage.
Figure 5:
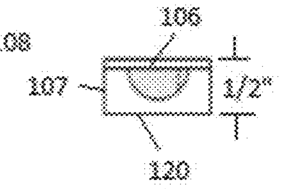
FIG. 5 depicts a front view detail of a storage unit portion of the artists' brush cover of the first embodiment of the present invention.
Figure 6:
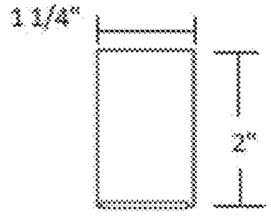
FIG. 6 depicts a top view detail of a storage unit portion of the artists' brush cover of the first embodiment of the present invention.
Figure 7:
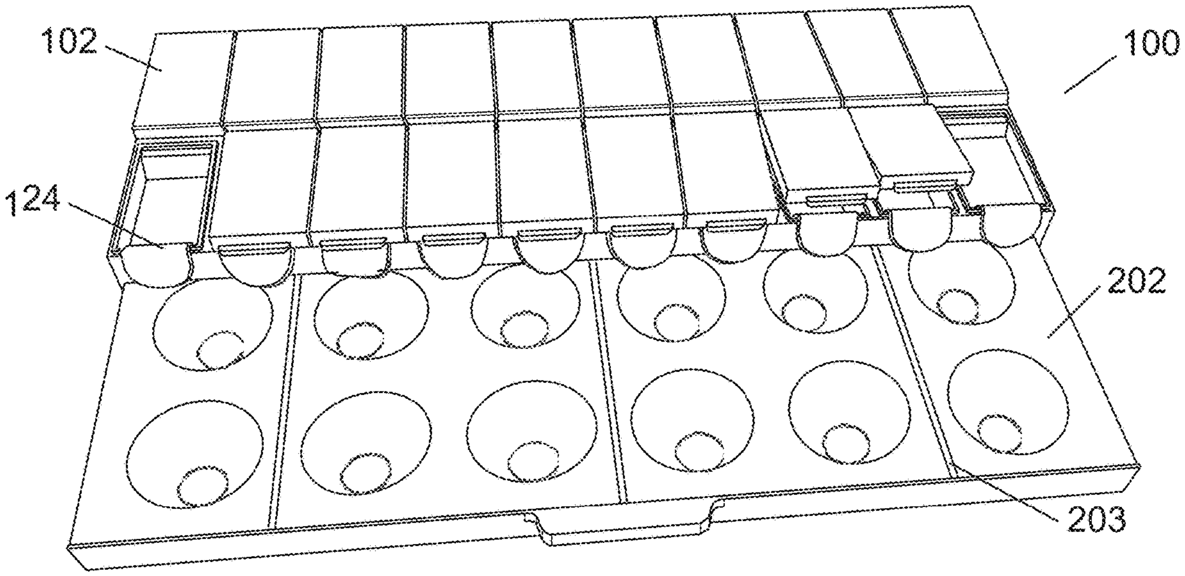
FIG. 7 depicts a top perspective view of the artists' brush cover of the first embodiment of the present invention with the palette portion and the covers of several storage units opened, as well as with other covers removed for clarity.
Figure 8:
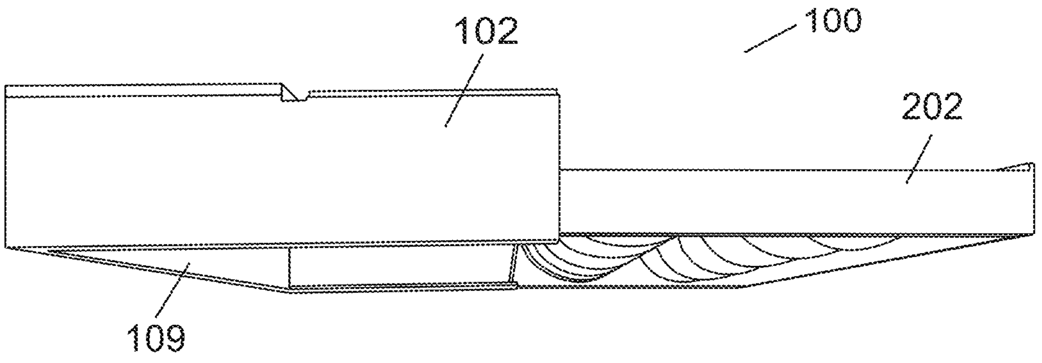
FIG. 8 depicts a side view of the artists' brush cover of the first embodiment of the present invention with the palette portion opened.
Figure 9:
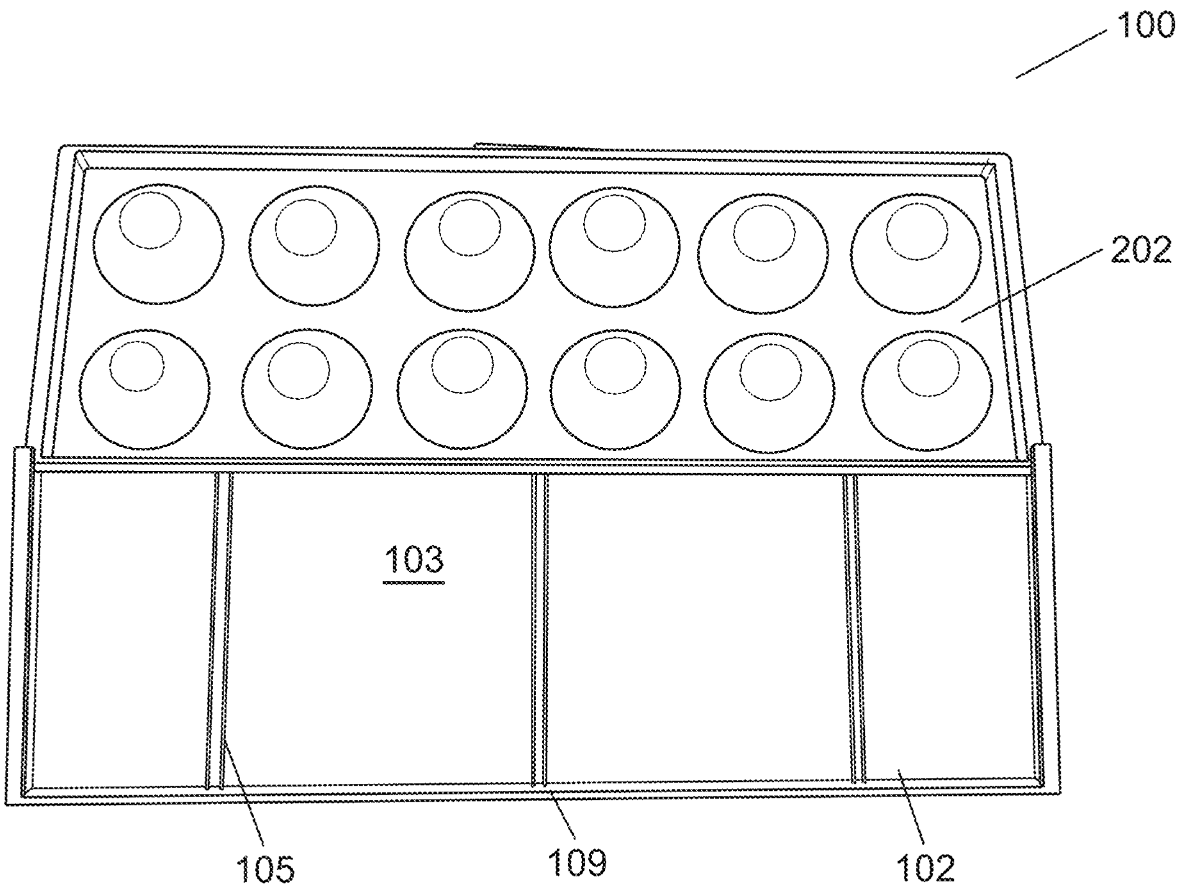
FIG. 9 depicts a bottom view of the artists' brush cover of the first embodiment of the present invention with the palette portion opened.
Figure 10:
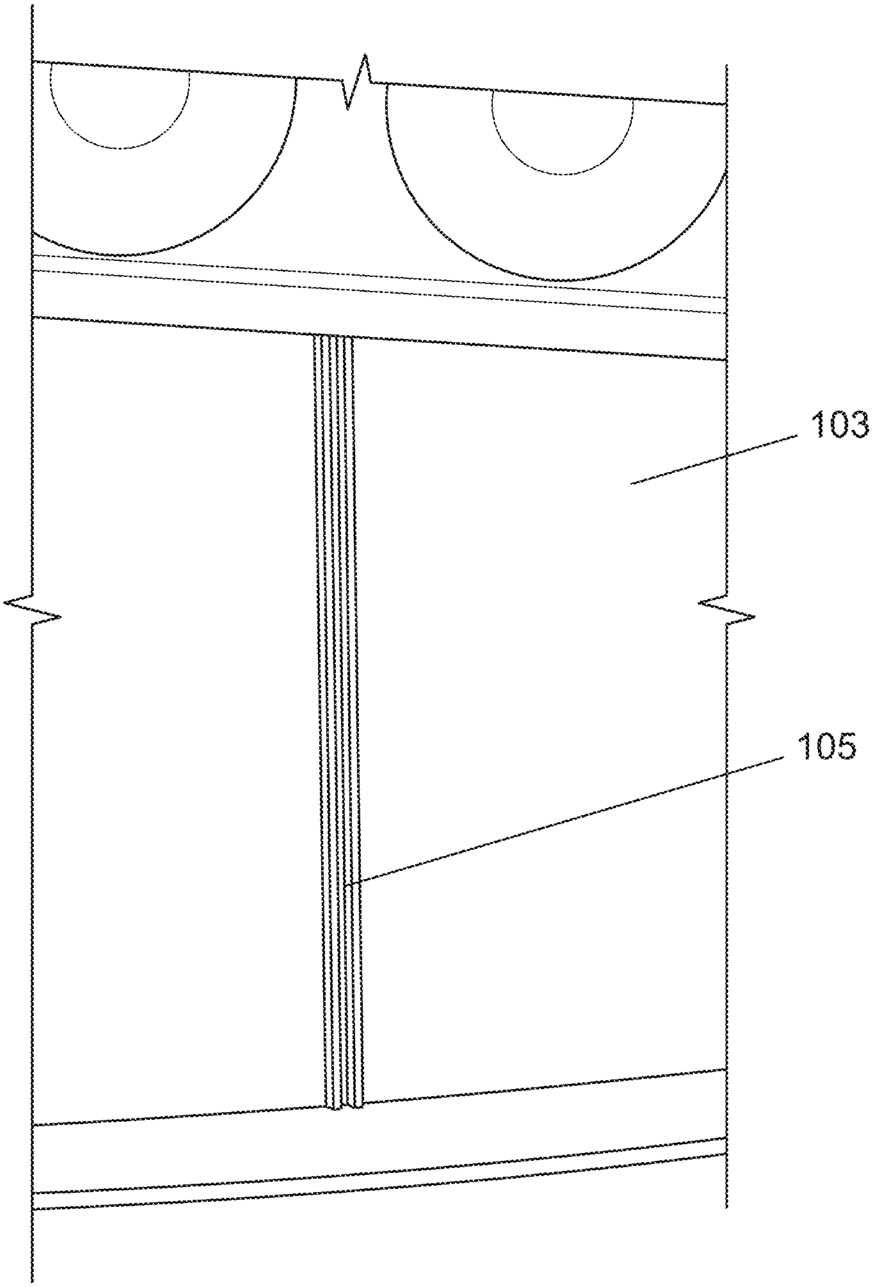
FIG. 10 depicts a bottom detail view of the artists' brush cover of the first embodiment of the present invention.
Figure 11:
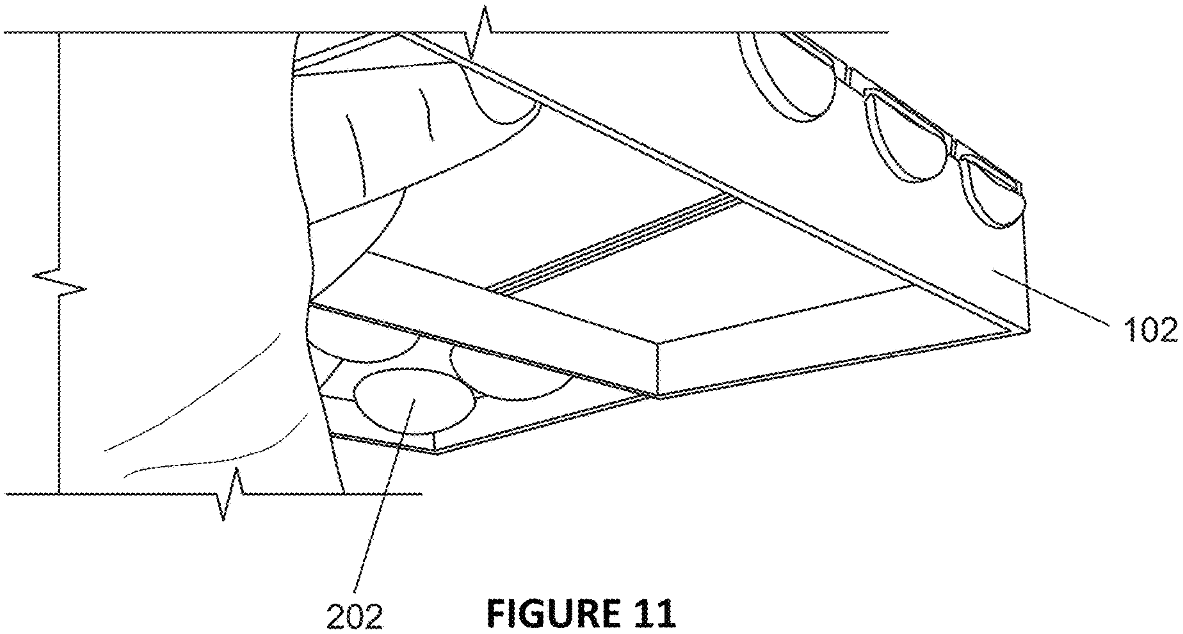
FIG. 11 depicts a bottom perspective view of the artists' brush cover of the first embodiment of the present invention, with the palette opened.
Figure 12:
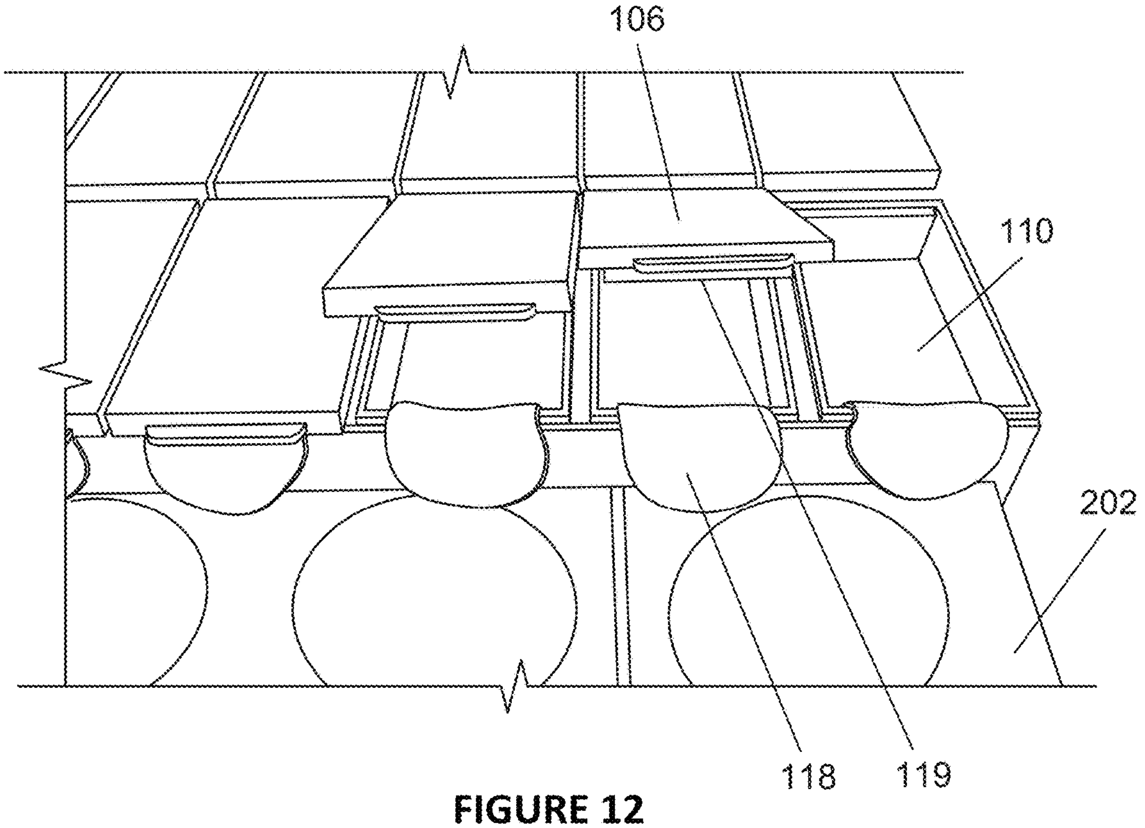
FIG. 12 depicts a top perspective detail view of the artists' brush cover of the first embodiment of the present invention with the palette portion and several storage units opened as well as one cover removed for clarity.
Figure 13:
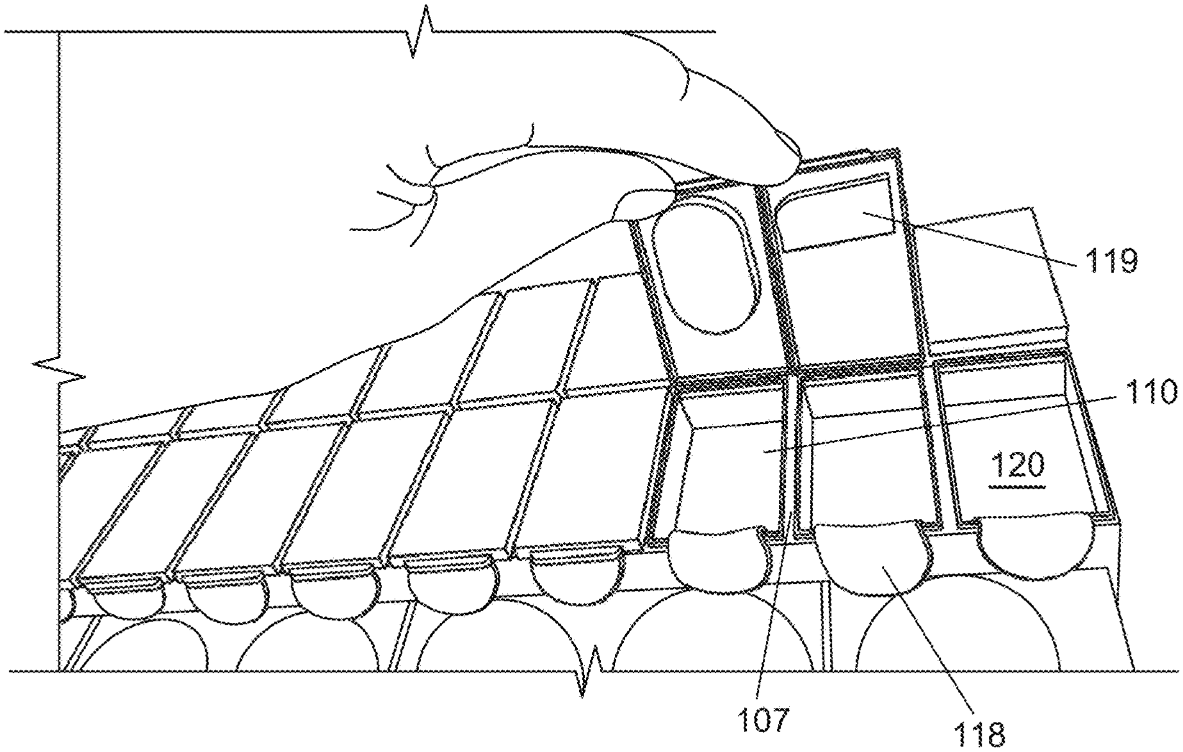
FIG. 13 depicts a top perspective detail view of the artists' brush cover of the first embodiment of the present invention with the palette portion and several storage units opened as well as one cover removed for clarity.
Figure 14:
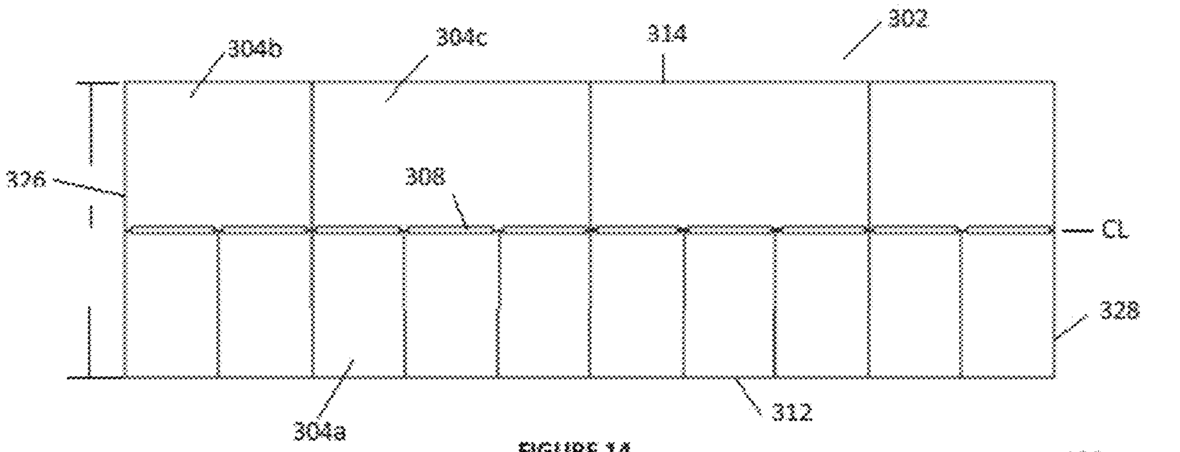
FIG. 14 depicts a top view of a storage unit portion of an artists' brush cover in accordance with a second embodiment of the present invention.
Figure 15:
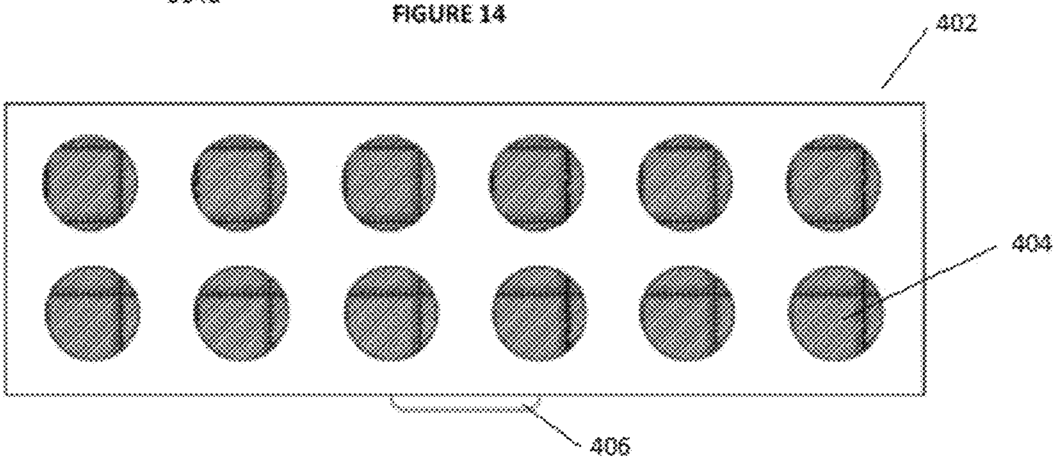
FIG. 15 depicts a top view of a palette portion of the artists' brush cover in accordance with the second embodiment of the present invention.
Figure 16:
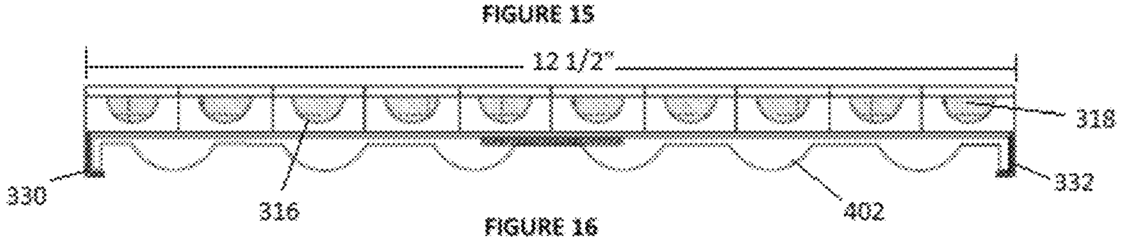
FIG. 16 depicts a front view of the artists' brush cover of the second embodiment of the present invention.
Figure 17:
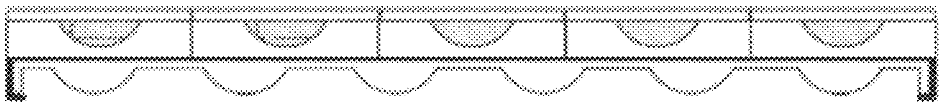
FIG. 17 depicts a front view of an artists' brush cover in accordance with an embodiment of the present invention other than the first or second embodiment.
Figure 18:
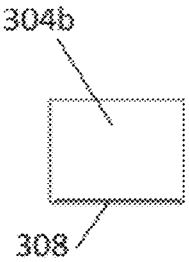
FIGS. 18-20 depict top view details of storage unit portions of the artists' brush cover of the second embodiment of the present invention.
Figure 19:
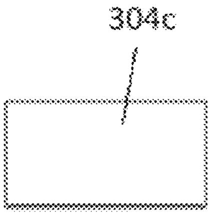
Figure 20:
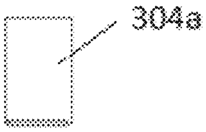

Rotation of the hinged covers between open and closed conditions is best shown in FIG. 4. Once opened, each of the storage compartments 104 reveals a paint well 110, defined by upstanding walls 107 and a floor 120, within which pure paint or mixed paint may be placed.

With the hinges 108 all aligned on the centerline CL, it will be appreciated that the storage compartments 104 each open from an outside edge 112, 114 respectively (outside edge 112 being considered the front of artists' brush cover 100). At the respective outside edge 112, 114, each storage compartment 104 includes a recess 116, preferably in the form of a semi-circle, but alternatively in other shapes. The recess 116 is filled with a sealing member 118, typically comprising open or closed cell foam. The corresponding cover 100 may optionally include an additional sealing member 119, again a piece of open or close cell foam, which mates against sealing member 118 when the cover is closed.

In use, it will be appreciated that a storage compartment 104 may be opened by rotating the cover 106 about the hinge 108. This reveals the paint well 110. Paint may then be placed into the paint well 110 in its pure form, or multiple pure paints can be mixed within the paint well. When the cover 106 is opened, a brush may be utilized to mix the paint or pick up paint, as the case may be. To aid in keeping the paint from moving toward the sealing member 118, the floor 120 of the paint well 110 may be provided with, or formed into, a wedge 122 tapered toward the hinge 108.

From time to time it may become advantageous to preserve this paint. At such time, the cover 106 may be closed, essentially sealing the paint well 110 and preserving the humidity levels within the paint well by virtue of the natural seal formed at the mating surfaces of the cover 106 and the upstanding walls 107, sealing member 118, and optionally additional sealing member 119, of the storage compartment 104, which all act to create a substantially air-tight seal against the outside atmosphere. Thus, wet paint can be stored for a longer period than if left exposed to atmospheric conditions.

Regarding the connection between the upstanding walls 107 and the cover 106, it will be appreciated that the cover 106 may include a U-shaped channel which fits over the upstanding wall 107.

If it is desired to also store a brush B, the artist may place the bristles of the brush within the paint well 110 with the handle resting on the top 124 of the sealing member 118. The artist may then lower the cover 106 to compress the sealing member 118 (and optionally additional sealing member 119) around the handle of the brush, thus aiding in keeping the brush moist as well as the paint within the paint well 110. A brush B so positioned is shown in FIG. 4. As before, once the cover 106 is closed, there is a substantially air-tight seal formed between the mating of the cover and the storage compartment 104 as well as between the cover and the sealing member 118 (and optionally additional sealing member 119).

In the first embodiment shown in FIGS. 1-13, the storage unit 102 is preferably 12½" long and 4" wide. Thus, each equally sized individual storage compartment 104 is approximately 1¼" wide by approximately 2" long. Each paint well 110 is also approximately ½" deep.

In other embodiments the overall dimensions of the storage unit may be different, for example ranging from approximately 10" long to approximately 16" long and 3" wide to approximately 5" wide, in any combination therebetween. Other sizes may also be configured.

In other embodiments there may be more or less storage compartments 104 per storage unit 102. Moreover, the size of the individual storage compartments 104 may differ from the dimensions above. It will also be appreciated that different storage compartments 104 of the same storage unit 102 may be different sizes. For example, it may be advantageous to provide a plurality of storage compartments which are 1¼" wide and 2" long together with other storage compartments that are 2½" wide and 2" long within the same storage unit, thus accommodating a wider range of brush sizes.

An example of an artists' brush cover 300 having other storage arrangements is shown in the second embodiment, FIGS. 14-29.

The storage unit 102 includes two side edges, 126, 128 spanning between the two outside edges 112, 114. These side edges not only form portions of the paint well 110 at the adjacent storage compartments 104, but extend below the level of the floor 120 to form drawer slides 130, 132.

The drawer slides 130, 132, are L-shaped and support the palette 202 below the storage unit 102, while also permitting the palette to slide in and out of concealment in the same manner as a drawer. In some embodiments the palette portion may slide beyond the storage unit in two directions, both towards and away from pull tab 206. In other embodiments, for example the first embodiment shown, the artists' brush cover may include features to physically block the palette from extending beyond the storage unit in a direction opposite the pull tab 206, such as wall 109.

Palette 202 is generally rectangular and of slightly smaller dimension than storage unit 102. As an example, with the storage unit 102 dimensions provided above, the palette may be 12⅜" long and 3⅞" wide.

The palette is formed with a plurality of recessed wells 204 in which pure paint and/or mixed paint may be placed. In the embodiment shown, there are provided two rows of six recessed wells 204, hemispherical in shape, and approximately 2" on-center. Other sizes and configurations are also contemplated.

The palette 202 includes a pull tab 206 to help facilitate opening and closing, or sliding in and out, of the palette.

In addition to sliding on the L-shaped drawer slides, 130, 132, the palette 202 and storage unit 102 may include interconnecting support features. For example, the palette 202 may include extension members 203 that fit within tracks 105 formed on the underside 103 of the storage unit 102 to help support the palette. For this purpose, the extension members 203 may be T-shaped and the tracks 105 may include a pair of corresponding undercuts.

The mating surfaces of the storage unit 102 and palette 202 are preferably configured such that, when closed, the palette is substantially air-tight or at least impairs airflow to an extent so as to preserve moisture levels in any paint stored within the recessed wells 204.

A second embodiment of the present invention is shown in FIGS. 14-29, where an artists' brush cover 300 comprises a storage unit 302 and a palette 402, where the palette is slidably engaged to an underside 303 of the storage unit.

Figure 21:
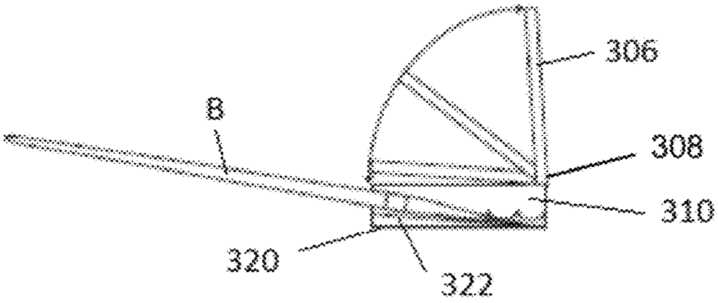
FIG. 21 depicts a side view detail of a paint well portion of the artists' brush cover of the second embodiment of the present invention with the cover in various positions and a paint brush positioned for storage.
Figure 22:
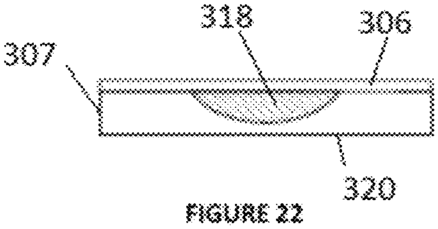
FIGS. 22-24 depict front view details of storage unit portions of the artists' brush cover of the second embodiment of the present invention.
Figure 23:
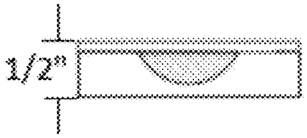
Figure 24:
Figure 25:
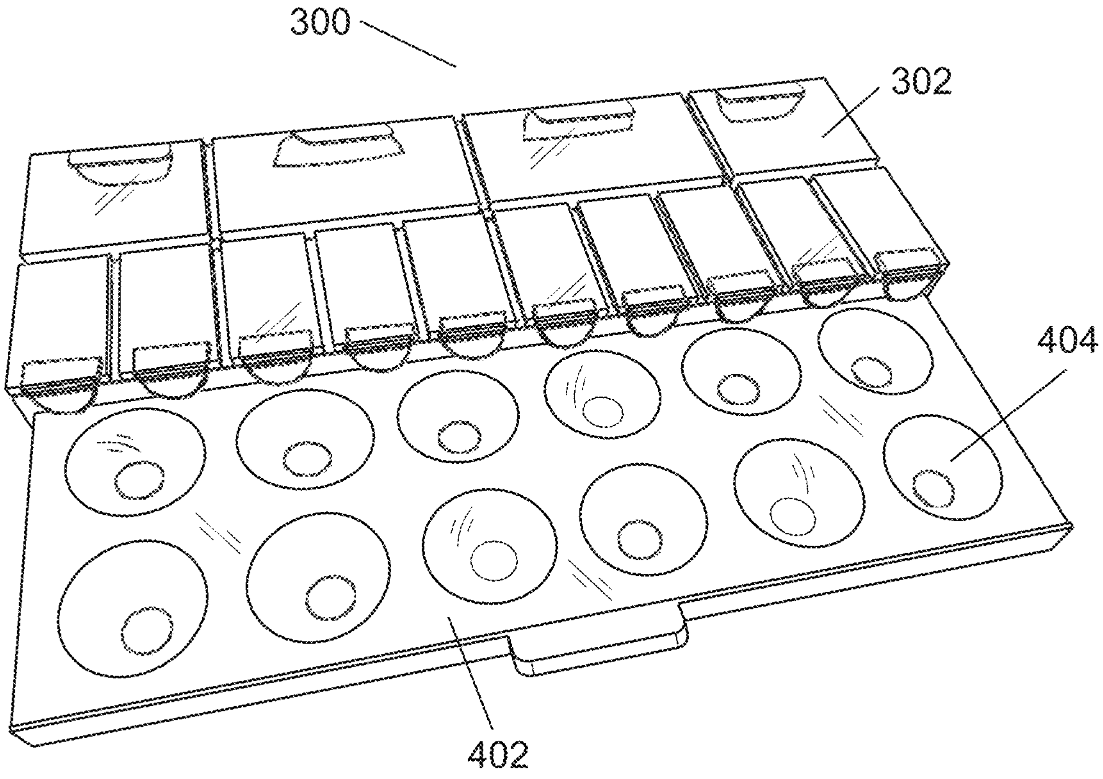
FIG. 25 depicts a top perspective view of the artists' brush cover of the second embodiment of the present invention with the palette portion opened.
Figure 26:
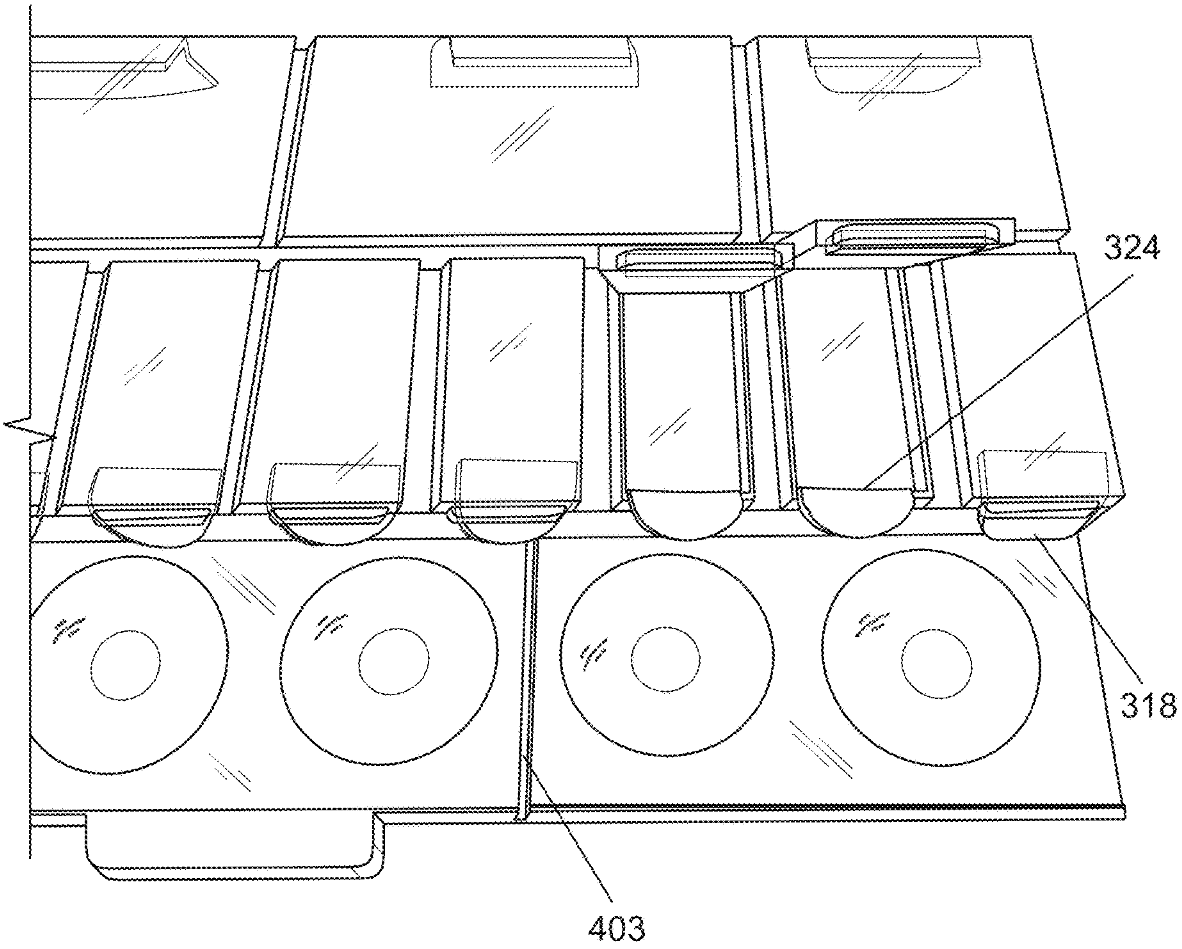
FIG. 26 depicts a top perspective detail view of the artists' brush cover of the second embodiment of the present invention with the palette portion and two covers opened.
Figure 27:
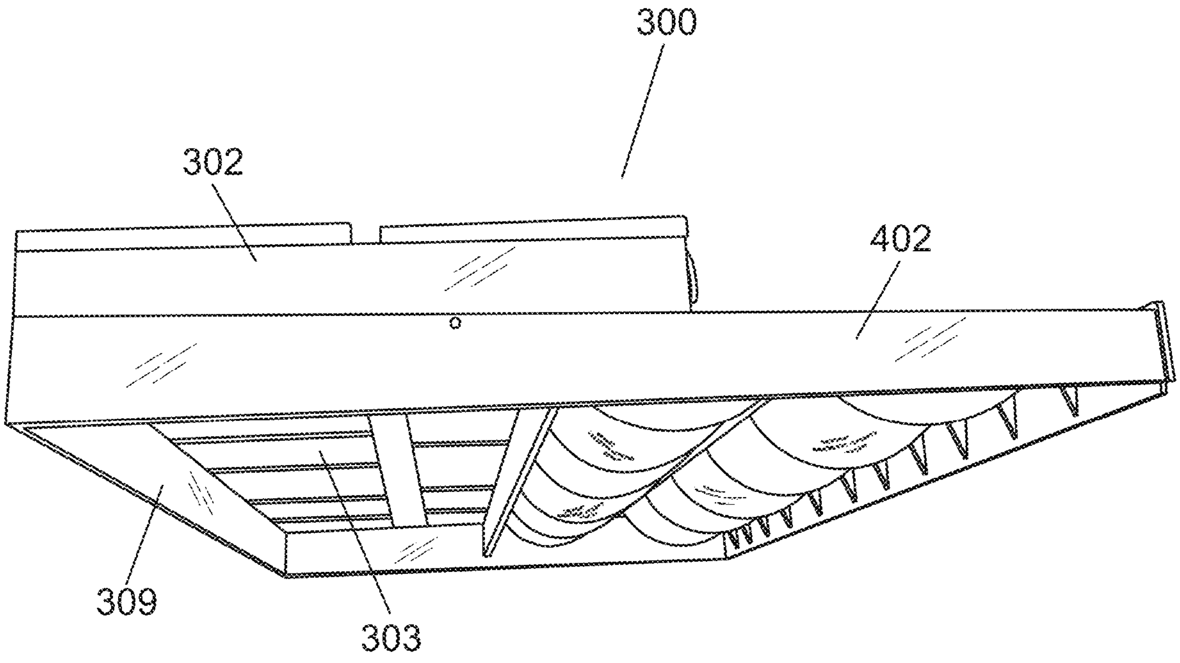
FIG. 27 depicts a side view of the artists' brush cover of the second embodiment of the present invention with the palette portion opened.
Figure 28:
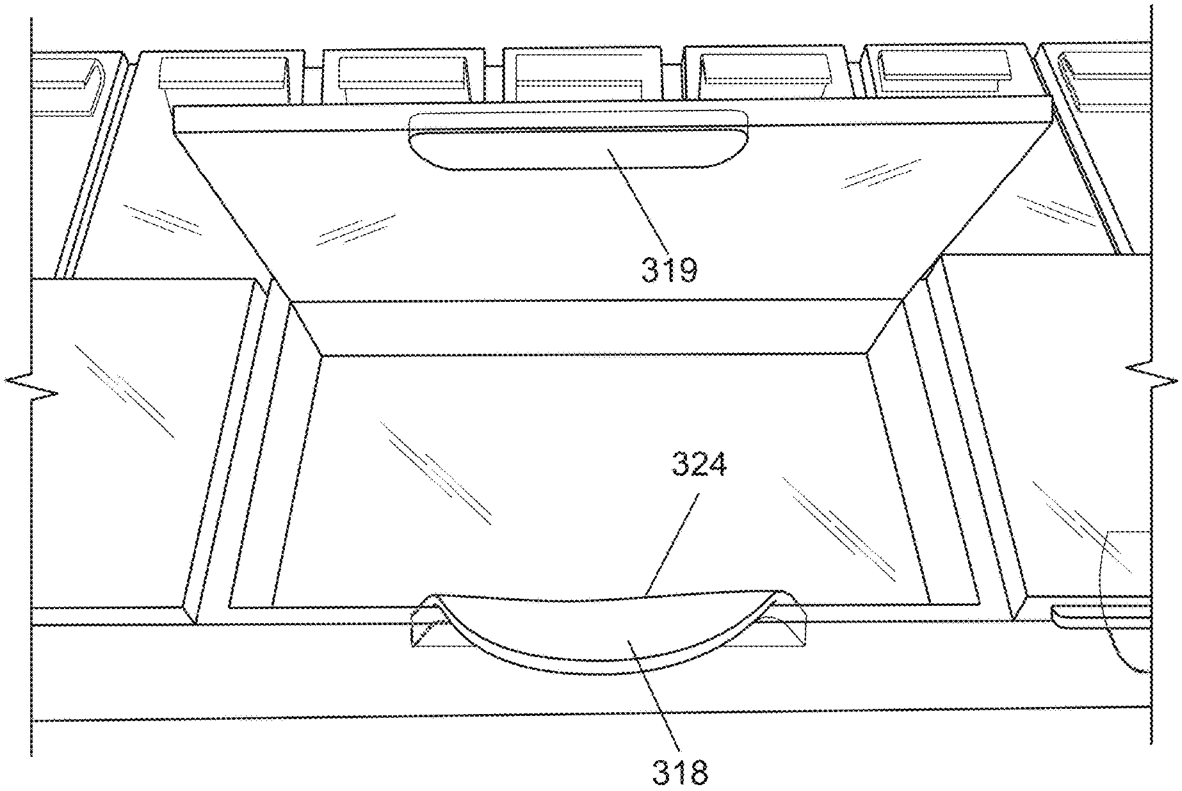
FIG. 28 depicts a top perspective detail view of the artists' brush cover of the second embodiment of the present invention a cover opened; and, FIG. 29 depicts a bottom perspective detail view of the artists' brush cover of the second embodiment of the present invention.
Figure 29:
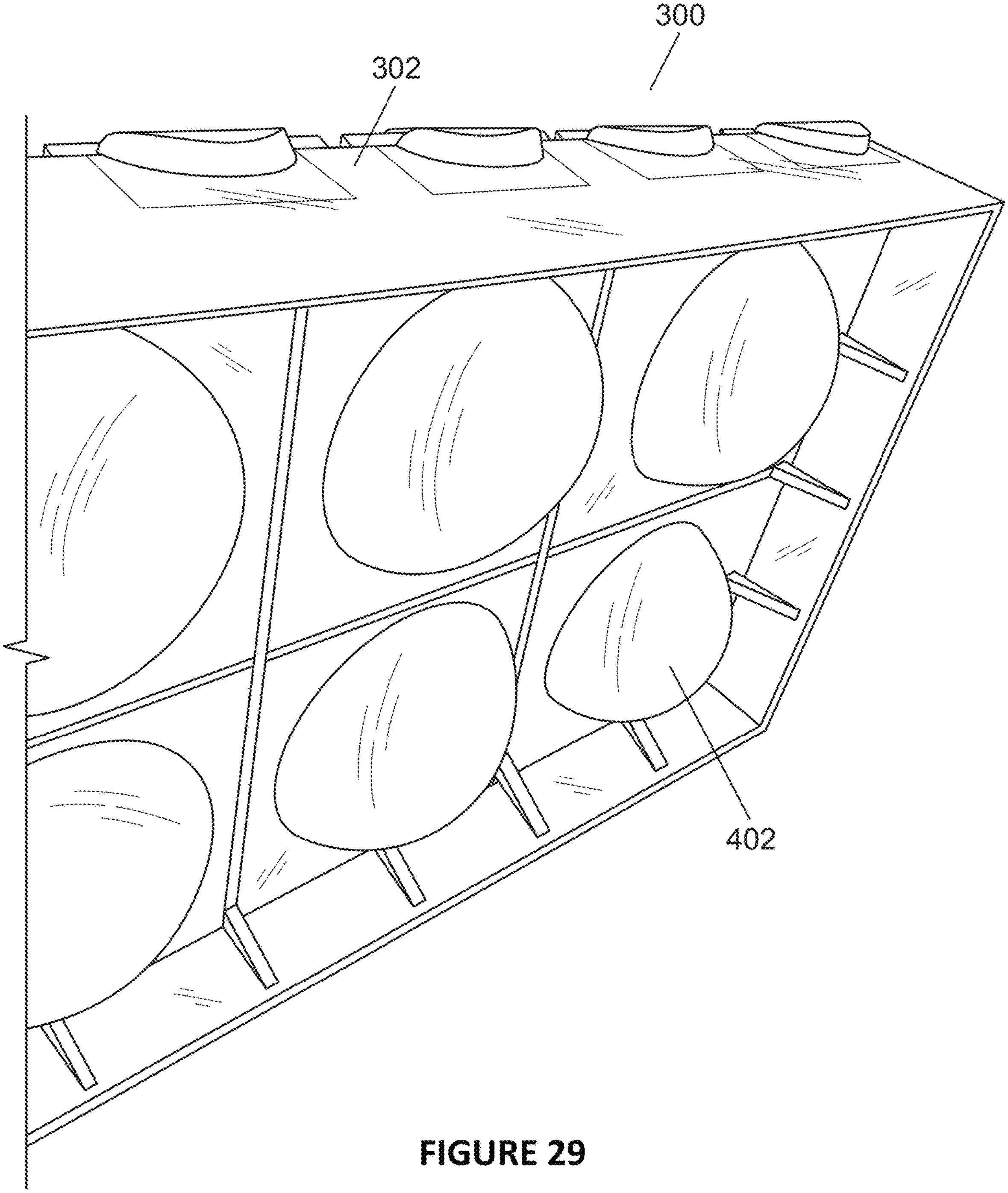

The storage unit 302 in the second embodiment is preferably rectangular and comprises two rows of storage compartments **304*a*, 304*b*, 304*c*, similar to those of the first embodiment. However, here, the storage compartments 304*a*, 304*b*, 304*c*, are not all of equal width. Rather, a first row of ten storage compartments 304*a* are of equal width while a second row includes two storage compartments 304*b* each equaling the combined width of two first row storage compartments 304*a* and two storage compartments 304*c* each equaling the combined width of three first row storage compartments 304*a*, for a total of fourteen storage compartments. The storage compartments 304*a*, 304*b*, 304*c*, each include a cover 306 that can rotate open or closed via a hinge 308, such as a living hinge, the hinges all aligned along a centerline CL of the storage unit 302. Rotation of the covers is best shown in FIG. 21. Once opened, each of the storage compartments 304 reveals a paint well 310, defined by upstanding walls 307 and a floor 320**, within which pure paint or mixed paint may be placed.

With the hinges 308 all aligned on the centerline CL, it will be appreciated that the storage compartments **304*a*, 304*b*, 304*c*, each open from an outside edge 312, 314 respectively. At the respective outside edge 312, 314, each storage compartment 304*a*, 304*b*, 304*c*, includes a recess 316, preferably in the form of a semi-circle but alternatively in other shapes. The recess 316 is filled with a sealing member 318, typically comprising open or closed cell foam. The corresponding cover 306 may optionally include an additional sealing member 319, again a piece of open or close cell foam, which mates against sealing member 318** when the cover is closed.

In use, it will be appreciated that a storage compartment **304*a*, 304*b*, 304*c* may be opened by rotating the cover 306 about the hinge 308. This reveals the paint well 310. Paint may then be placed into the paint well 310 in its pure form, or multiple pure paints can be mixed within the paint well. When the cover 306 is opened, a brush may be utilized to mix the paint or pick up paint, as the case may be. To aid in keeping the paint from moving toward the sealing member 318, the floor 320 of the paint well 310 may be provided with, or formed into, a wedge 322 tapered toward the hinge 308**.

From time to time it may become advantageous to preserve this paint. At such time, the cover 306 may be closed, essentially sealing the paint, well 310 and preserving the humidity levels within the paint well by virtue of the natural seal formed at the intersection of the cover 306 and the storage compartment **304*a*, 304*b*, 304*c* as well as provided by the sealing member 318 and optionally additional sealing member 319**, which all act to create a substantially air-tight, seal against the outside atmosphere. Thus, wet paint can be stored for a longer period than if left exposed to atmospheric conditions.

If it is desired to also store a brush, the artist may place the bristles of the brush within the paint well 310 with the handle resting or the top 324 of the sealing member 318. The artist may then lower the cover 306 to compress the sealing member 318 (and optionally additional sealing member 319) around the handle of the brush, thus aiding in keeping the brush moist as well as the paint within the paint well 310. A brush B so positioned is shown in FIG. 21. As before, once the covers 306 are so closed, there is a substantially air-tight seal formed between the intersection of the cover and the respective storage compartment 304*a*, 304*b*, 304*c*, by virtue of the mating of upstanding walls 307 and the covers, as well as between the covers and the sealing member 318. It will be appreciated that, the covers 306 may include a U-shaped channel for mating around the upstanding walls 307.

In the second embodiment, the storage unit 302 is preferably 12½" long and 4" wide. Thus, each individual storage compartment 304*a* is approximately 1¼" wide by approximately 2" long, each storage compartment 304*b* is approximately 2½" wide by approximately 2" long, and each storage compartment 304*c* is approximately 3¾" wide by approximately 2" long. Each paint well 310 is also approximately ½" deep.

In other embodiments there may be more or less storage compartments 304*a*, 304*b*, 304*c*, per storage unit 302. Moreover, the size of the storage compartments 304*a*, 304*b*, 304*c*, may differ from the dimensions above. For example, the paint wells may be ¼" to 1" deep.

The storage unit 302 includes two side edges, 326, 328 spanning between the two outside edges 312, 314. These side edges not only form portions of the paint well 310 at the adjacent storage compartments 304, but extend below the level of the floor 320 to form drawer slides 330, 332.

The drawer slides 330, 332, are L-shaped and support the palette 402 below the storage unit 302, while also permitting the palette to slide in and out of concealment in the same manner as a drawer.

Palette 402 is generally rectangular and of slightly smaller dimension than storage unit 302. As an example, with the storage unit 302 dimensions provided above, the palette may be 12⅜" long and 3⅞" wide.

The palette is formed with a plurality of recessed wells 404 in which pure paint and/or mixed paint may be placed. Like the first embodiment, in the embodiment shown there are provided two rows of six recessed wells 404, hemispherical in shape, and approximately 2" on-center. Other sizes and configurations are also contemplated.

The palette 402 includes a pull tab 406 to help facilitate opening and closing, or sliding in and out, of the palette.

In addition to sliding on the L-shaped drawer slides, 330, 332, the palette 402 and storage unit 302 may include interconnecting support features. For example, the palette 402 may include extension members 403 that fit within tracks (not annotated) formed on the underside 303 of the storage unit 302 to help support the palette.

In the embodiment shown, the palette 402 may only open in a direction toward the pull tab 406 due to the physical interference caused by wall 309. In other embodiments, wall 309 may be absent.

The mating surfaces of the storage unit 302 and palette 402 are preferably configured such that, when closed, the palette is substantially air-tight or at least impairs airflow to an extent so as to preserve moisture levels in any paint stored within the recessed wells 404.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An artists' brush storage and protection device comprising:

a storage unit having a plurality of storage compartments each of said plurality of storage compartments defining an associated paint well with upstanding walls and an associated cover, one of said upstanding walls including a recess with a sealing member disposed in said recess;

wherein, each of said associated covers is adapted to be placed in an open condition permitting access to one of said associated paint wells and a closed condition positioned against said upstanding walls and said sealing member to enclose said one of said associated paint wells;

drawer slides associated with said storage unit; and, a palette, said palette being slidable relative to said storage unit via said drawer slides to reveal or conceal said palette.

2. The artists' brush storage and protection device of claim 1, wherein each of said associated covers is hinged with a hinge.

3. The artists' brush storage and protection device of claim 2, wherein each of said hinges is a living hinge.

4. The artists' brush storage and protection device of claim 3, wherein, when bristles of a paint brush are placed in one of said associated paint wells, a handle of the paint brush mayrest upon said sealing member, said sealing m ember being adapted to compress around the handle when the associated cover is closed to provide a substantially air-tight seal between said one of said associated paint wells and the atmosphere outside of said one of said associated paint wells.

5. The artists' brush storage and protection device of claim 1, wherein said palette includes recesses for receiving paint.

6. The artists' brush storage and protection device of claim 1, further comprising two rows of storage compartments.

7. The artists' brush storage and protection device of claim 6, wherein a first of said rows has more storage compartments than a second of said rows.

8. The artists' brush storage and protection device of claim 7, wherein said first of said rows has ten storage compartments and said second of said rows has four storage compartments.

9. The artists' brush storage and protection device of claim 8, wherein said second row has two storage compartments larger than a remaining two of said four storage compartments.

10. An artists' brush storage and protection device comprising:

a storage unit having exterior walls and interior walls forming a plurality of storage compartments, each of said plurality of storage compartments forming a paint well for directly receiving paint;

said storage unit further comprising drawer slides and a palette, said palette being slidably engaged along said drawer slides to reveal or conceal said palette.

11. The artists' brush storage and protection device of claim 10, wherein each of said plurality of storage compartments includes a cover.

12. The artists' brush storage and protection device of claim 11, wherein each of said plurality of storage compartments includes a sealing member disposed in an associated exterior wall recess.

13. The artists' brush storage and protection device of claim 11, wherein each of said covers is hinged to said storage unit via a living hinge.

14. The artists' brush storage and protection device of claim 13, wherein said palette comprises a plurality of recessed wells.

15. The artists' brush storage and protection device of claim 10, further comprising a first row and a second row of storage compartments.

16. The artists' brush storage and protection device of claim 10, wherein said plurality of storage compartments are not all of equal size.

17. The artists' brush storage and protection device of claim 10, wherein said plurality of storage compartments each include floors, said floors being sloped.

18. The artists' brush storage and protection device of claim 10, wherein said plurality of storage compartments are arranged in two rows, with a first of said two rows including ten storage compartments and a second of said two rows including four storage compartments.

19. The artists' brush storage and protection device of claim 10, wherein:

each of said plurality of storage compartments includes a cover adapted to open and close;

an exterior wall of each of said plurality of storage compartments includes a recess having a sealing member; and when bristles of a paint brush are placed in a paint well, a handle of the paint brush may rest upon said sealing member, said sealing member being adapted to compress around the handle when said cover is closed to provide a substantially air-tight seal between said paint well and the atmosphere outside of said paint well.

20. An artists' brush storage and protection device comprising:

a storage unit having a first plurality of storage compartments aligned in a first row and a second plurality of storage compartments aligned in a second row, said first plurality of storage compartments and said second plurality of storage compartments including covers with paint wells below said covers, said paint wells defined in part by upstanding walls, one of said upstanding walls including a recess with a sealing member disposed in said recess at an exterior portion of said storage unit, wherein, said covers are hinged and adapted to be placed in an open condition permitting access to said paint wells and a closed condition restricting access to said paint wells;

drawer slides associated with said storage unit; and, a palette, said palette being slidable relative to said storage unit via said drawer slides to reveal or conceal said palette.

21. The artists' brush storage and protection device of claim 20, wherein said storage unit includes a front and a back, and wherein said palette is revealed only at said front.

22. The artists' brush storage and protection device of claim 20, wherein said covers are hinged with living hinges.

* * * * *